UNITED STATES PATENT OFFICE.

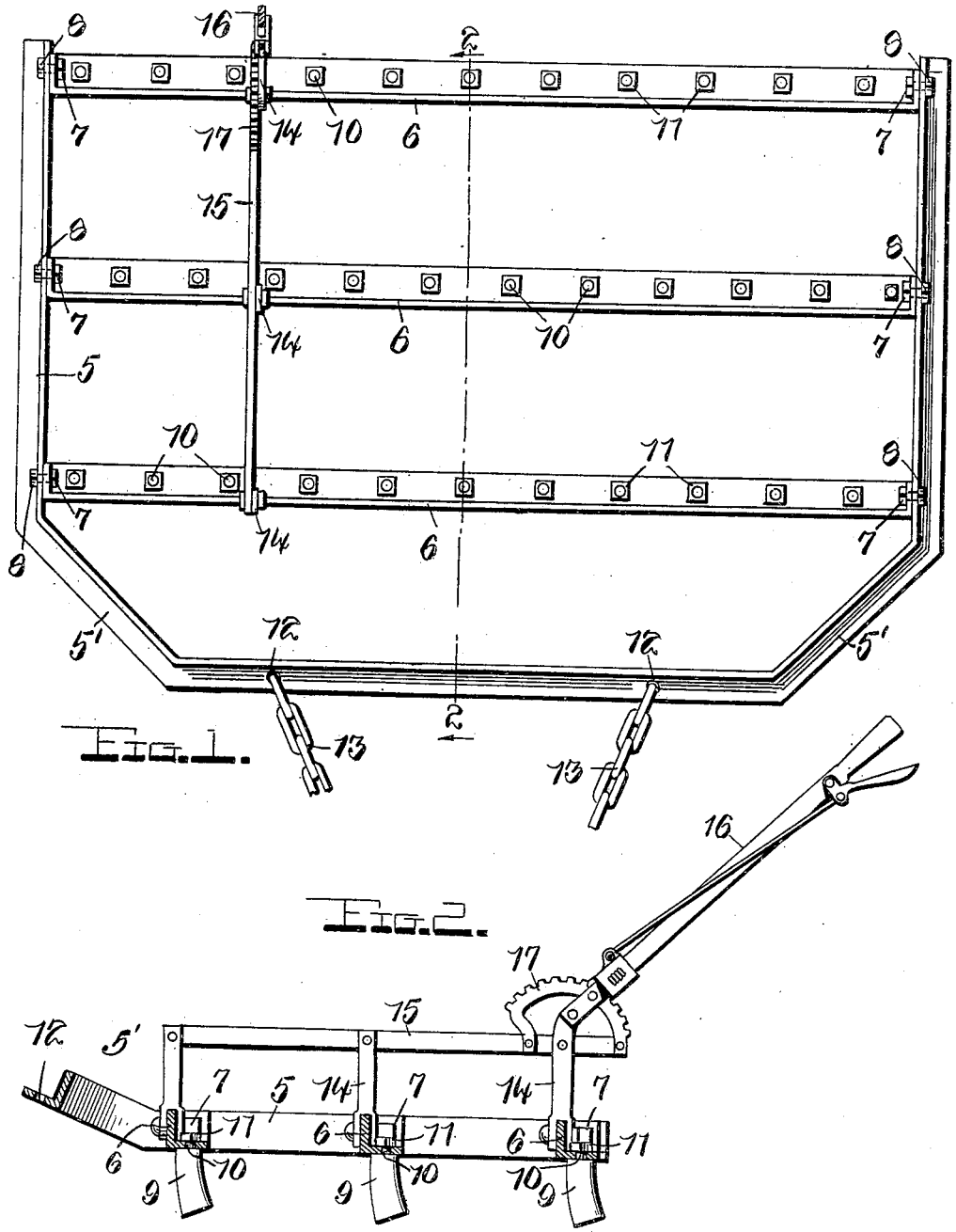

ALBERT S. KINDEL, OF FRENCH TOWNSHIP, ADAMS COUNTY, INDIANA.

HARROW.

979,312. Specification of Letters Patent. Patented Dec. 20, 1910.

Application filed June 16, 1910. Serial No. 567,310.

*To all whom it may concern:*

Be it known that I, ALBERT S. KINDEL, a citizen of the United States, residing in French township, in the county of Adams and State of Indiana, have invented certain new and useful Improvements in Harrows, of which the following is a specification, reference being had to the accompanying drawings.

This invention relates to improvements in harrows and has for its object to provide a simple, efficient and durable construction whereby the harrow blades may be readily adjusted to angularly position the same with relation to the line of movement whereby the same are caused to enter the ground to any desired depth.

A further object resides in the provision of means for quickly adjusting the harrow tooth carrying bars said means being so arranged and connected to the bars that but little exertion is required upon the part of the operator to adjust the bars.

With these and other objects in view, the invention consists of the novel features of construction, combination and arrangement of parts hereinafter fully described and claimed, and illustrated in the accompanying drawings, in which—

Figure 1 is a plan view of a harrow constructed in accordance with my invention; and Fig. 2 is a section taken on the line 2—2 of Fig. 1.

Referring more particularly to the drawing 5 indicates a substantially U-shaped frame constructed from a single length of angle iron. Between the parallel longitudinal end portions of this frame a plurality of tooth carrying bars 6 are arranged. These bars are also formed from angle iron and are pivoted at their ends to the sides of the frame 5 upon the bolts 7 which extend through openings in the ends of the tooth bars and the frame and have nuts 8 threaded upon their outer ends for engagement with the sides of the U-shaped frame. The ends of the tooth carrying bars are, however, pivotally movable on the bolts 7. To the horizontal portions of the angle bars 6 a plurality of harrow teeth 9 are secured. These teeth are in the form of blades one of the longitudinal edges of which is sharpened to a knife edge to cut into the soil thereby loosening the same without scattering the earth as is done by the usual spring tooth. Upon one end of each of the cutting blades a threaded stud 10 is formed which is disposed through an aperture in the horizontal flange of the bar 6 and has a nut 11 threaded upon its end for clamping engagement with said bar whereby the teeth are rigidly secured in position. The front intermediate portion 5' of the U-shaped frame 5 is upwardly disposed at an angle to the remaining longitudinal end portions thereof whereby the end of the frame is prevented from contacting with the ground surface when the machine is moved over hilly or uneven ground. This end of the frame 5 is provided with openings 12 to receive the ends of chains 13 which are connected to the draft bar of the team so that the machine may be used as a drag when desired.

To the tooth carrying bars 6 at one side of their longitudinal centers, a vertical arm 14 is rigidly secured. The upper ends of these arms are pivoted to a longitudinal bar 15. The arm 15 which is secured to the rear tooth carrying bar 6 is extended and formed into a lever 16. This lever carries the usual spring controlled dog for engagement with the teeth of a rack 17 which is secured to the end of the longitudinally disposed bar 15.

In the operation of the machine, when it is desired to adjust the cutting teeth 9, the lever 16 is moved by the operator which turns the angle bars 6 upon their pivot bolts 7, the vertical arms 14 swinging upon the longitudinally disposed bar 15 which moves rearwardly or forwardly in accordance with the direction of movement of the operating lever. After the harrow teeth have been properly positioned the lever is locked upon the rack 17 thereby rigidly securing the angle bars in their adjusted positions. By thus adjusting the harrow teeth the cutting edges thereof are caused to enter the ground to a greater or less extent as may be desired. The cutting blades are preferably slightly curved so that when the bars 6 are disposed at right angles to the sides of the U-shaped frame, they extend rearwardly of said bars.

From the foregoing it will be seen that I have devised a very simple and efficient harrow which may be easily and quickly adjusted by the operator with but little exertion. The various parts of the machine are of common construction so that they may be easily replaced when necessary thereby reducing the cost of repairs to a minimum. It will be obvious that any desired number of cutting blades 9 may be employed and as they are detachably connected to the angle bars 6, they may be readily removed and sharpened thereby maintaining a high degree of efficiency in the operation of the machine.

Having thus described the invention what is claimed is:—

In a harrow, the combination of a substantially U-shaped frame, a plurality of transverse angular tooth-carrying bars arranged between the parallel portions of the frame, said bars each having a vertical and a horizontal web portion, pivot bolts extending through the ends of the bars and the frame to pivotally support said bars therein, a vertical arm bifurcated at one end to receive the vertical web of the bar and adapted to be secured thereon, a longitudinally movable bar pivoted to the upper ends of the vertical arms, a rack secured to the rear end of said bar, and a lever secured to the upper end of the rear vertical arm and disposed rearwardly and at an angle with relation to the same, said lever carrying a spring-controlled dog for engagement with the teeth of the rack to lock the longitudinal bar against movement.

In testimony whereof I hereunto affix my signature in the presence of two witnesses.

ALBERT S. KINDEL.

Witnesses:
A. F. GARVEY,
L. N. O'CONNOR.